(12) United States Patent
Gao et al.

(10) Patent No.: US 6,483,978 B1
(45) Date of Patent: Nov. 19, 2002

(54) COMPACT OPTICAL AMPLIFIER MODULE

(75) Inventors: Renfeng Gao, Phoenixville, PA (US); Renyuan Gao, Strafford, PA (US)

(73) Assignee: Photon-X, Inc., Malvern, PA (US)

( * ) Notice: Subject to any disclaimer, the term of this patent is extended or adjusted under 35 U.S.C. 154(b) by 6 days.

(21) Appl. No.: 09/877,954

(22) Filed: Jun. 8, 2001

(51) Int. Cl.[7] .............................................. G02B 6/100
(52) U.S. Cl. ........................ 385/135; 385/134; 385/24; 359/341.1; 359/124
(58) Field of Search .................. 385/134–137, 385/24; 359/341.1, 344, 124, 161, 177

(56) References Cited

U.S. PATENT DOCUMENTS

| | | |
|---|---|---|
| 5,504,609 A | 4/1996 | Alexander et al. |
| 5,515,200 A * | 5/1996 | Delrosso et al. ........ 385/135 X |
| 5,532,864 A | 7/1996 | Alexander et al. |
| 5,557,439 A | 9/1996 | Alexander et al. |
| 5,778,132 A | 7/1998 | Csipkes et al. |

* cited by examiner

Primary Examiner—Phan T. H. Palmer
(74) Attorney, Agent, or Firm—Joseph E. Maenner

(57) ABSTRACT

An optical amplifier module is disclosed. The optical amplifier module includes a housing having an interior length and an interior width generally shorter than the interior length and an electronic control board disposed within the housing. The electronic control board includes a plurality of electronically connected components. The optical amplifier module also includes a gain medium disposed in the housing in a generally circularly spiral shape, such that the gain medium has a radius of curvature approximately one half the interior width of the housing. The optical amplifier module further includes a pump laser electronically connected to the electronic control board and optically connected to the gain medium.

21 Claims, 2 Drawing Sheets

US 6,483,978 B1

COMPACT OPTICAL AMPLIFIER MODULE

STATEMENT REGARDING FEDERALLY FUNDED SPONSORED RESEARCH OR DEVELOPMENT

The U.S. Government has a paid-up license in this invention and the right in limited circumstances to require the patent owner to license others on reasonable terms as provided for by the terms of Contract No. N00014-00-C-0117 awarded by the Department of the Navy.

FIELD OF THE INVENTION

The present invention relates to compact optical amplifiers.

BACKGROUND OF THE INVENTION

Optical communication systems based on glass optical fibers (GOF) allow communication signals to be transmitted not only over long distances with low attenuation, but also at extremely high data rates, or bandwidth capacity. This capability arises from the propagation of a single optical signal mode in the low-loss windows of glass located at the near-infrared wavelengths of 850, 1310, and 1550 nm. Since the introduction of erbium-doped fiber amplifiers (EDFAs), the last decade has witnessed the emergence of single-mode GOF as the standard data transmission medium for wide area networks (WANs), especially in terrestrial and trans-oceanic communication backbones. In addition, the bandwidth performance of single-mode GOF has been vastly enhanced by the development of dense wavelength division multiplexing (DWDM), which can couple up to 40 channels of different wavelengths of light into a single fiber, with each channel carrying up to 10 gigabits of data per second. Moreover, recently, a signal transmission of 1 terabit ($10^{12}$ bits) per second has been achieved over a single fiber on a 100-channel DWDM system. Bandwidth capacities are increasing at rates of as much as an order of magnitude per year.

The success of the single-mode GOF in long-haul communication backbones has given rise to the new technology of optical networking. The universal objective is to integrate voice video, and data streams over all-optical systems as communication signals make their way from WANs down to smaller local area networks (LANs) of Metro and Access networks, down to the curb (FTTC), home (FTTH), and finally arriving to the end user by fiber to the desktop (FTTD). Examples are the recent explosion of the Internet and use of the World Wide Web, which are demanding vastly higher bandwidth performance in short- and medium-distance applications. Yet, as the optical network nears the end user starting at the LAN stage, the network is characterized by numerous splittings of the input signal into many channels. This feature represents a fundamental problem for optical networks. Each time the input signal is split, the signal strength per channel is naturally reduced.

Rare earth doped optical amplifiers are emerging as the predominant optical signal amplification device for every aspect of optical communication networks spanning from repeaters, pre-amplifiers, and power boosters to wavelength division multiplexed (WDM) systems. These amplifiers are suitable for long-haul, submarine, metro, community antenna television (CATV) and local area networks. An optical amplifier amplifies an optical signal directly in the optical domain without converting the signal into an electrical signal and reconverting the electrical signal back to an optical signal. As optical telecommunication networks push further and further toward the end user, as represented by the technology of FTTC, FTTH, and FTTD, there is an ever growing demand for compact and low cost optical amplification devices.

Current fiber optics architectures utilize highly expensive, bulky EDFA modules based on costly electronic and photonic bulk components that require tedious alignment and connections. Known packaged optical amplifier assemblies include a number of commercially available optical components, such as optical isolators, erbium doped optical fibers, wavelength division multiplexing couplers, tap couplers, etc., which are fusion spliced together to form the optical part of an optical amplifier module. The electronics driving circuitry part of the optical amplifier is built on a separate platform, typically on a printed circuit board. The electronics board and the optical part are separate and are located in two different parts of the amplifier module. Such a multi-layer approach is suitable for complicated, multi-stage amplifiers used in long-haul optical communication systems. However, as an optical network nears the local area level, due to vast signal splitting, a more compact, low-cost, and easy to manufacture approach is needed.

It would be beneficial to provide a highly efficient, compact optical amplifier module that is designed and built utilizing integrated printed circuit board components. Such a module will provide a cost-effective, compact solution to the problem of signal reduction from splitting because the module will utilize reduced space, weight, size, and power consumption natural to integrated compact architectures.

BRIEF SUMMARY OF THE INVENTION

Briefly, the present invention provides an optical amplifier module. The optical amplifier module comprises a housing having an interior length and an interior width generally shorter than the interior length and an electronic control board disposed within the housing. The electronic control board includes a plurality of electronically connected components. The optical amplifier module further comprises a gain medium disposed in the housing in a generally circularly spiral shape, such that the gain medium has a radius of curvature approximately one half the interior width of the housing. The optical amplifier further comprises a pump laser electronically connected to the electronic control board and optically connected to the gain medium.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

Figure 1:
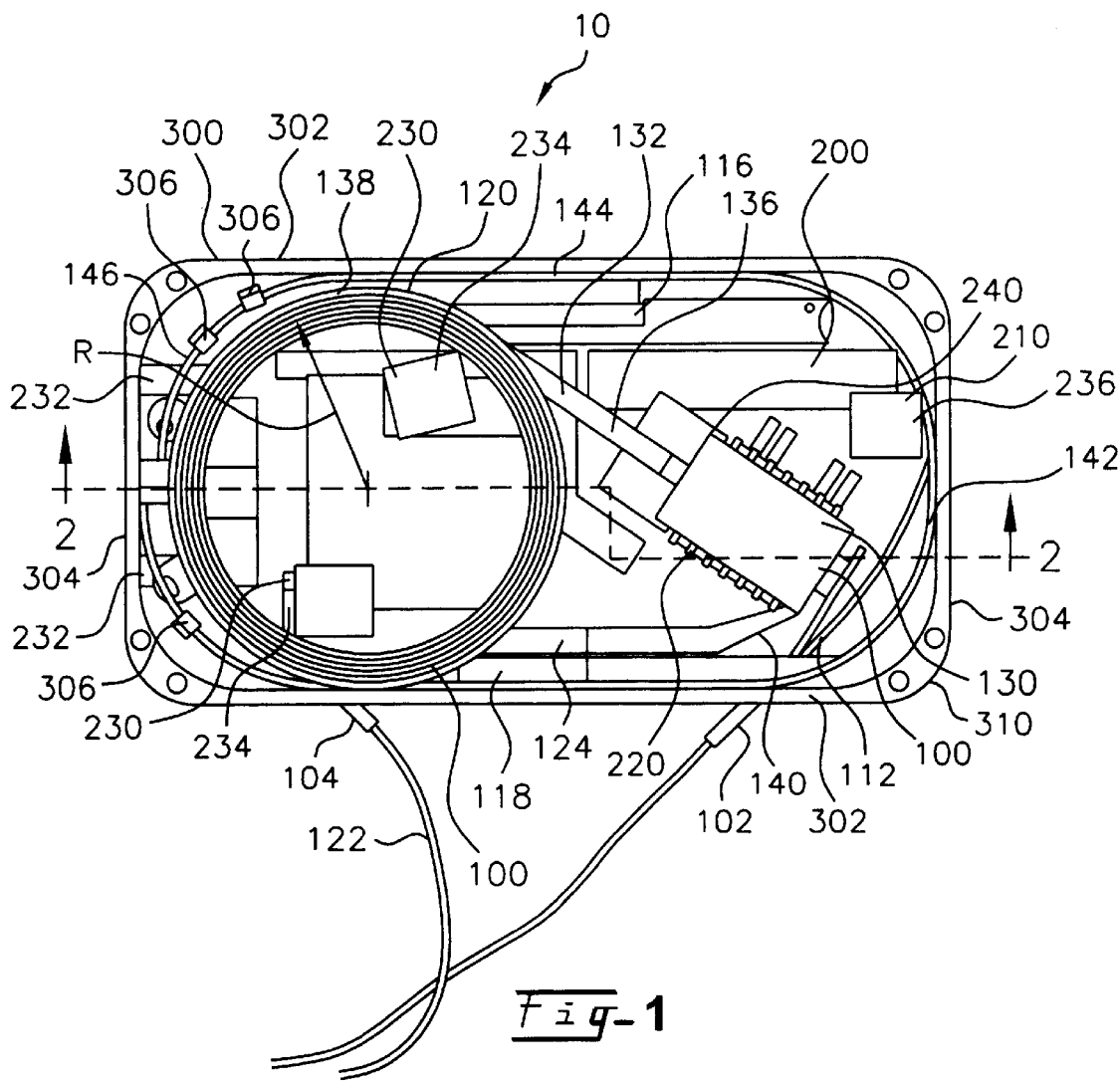
FIG. 1 is a plan view of an optical amplifier module according to the present invention, with a top cover of the module removed.

In the drawings, like numerals indicate like elements throughout. The present invention is an optical amplifier module 10, which is preferably used in an optical network near the local area level. However, those skilled in the art will recognize that the optical amplifier module 10 can also be used in the wide area level and, with appropriate environmental shielding known by those skilled in the art, terrestrial and transoceanic networks as well.

Figure 2:
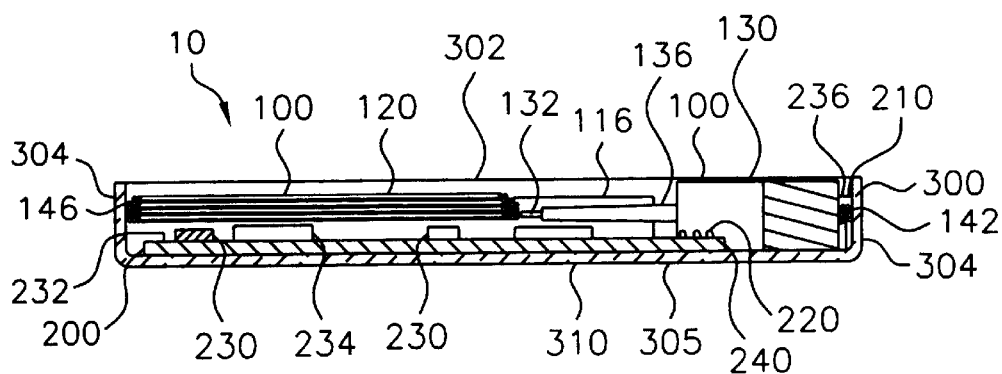
FIG. 2 is a sectional view of the optical amplifier according to FIG. 1, taken along line 2—2 of FIG. 1.
Figure 3:
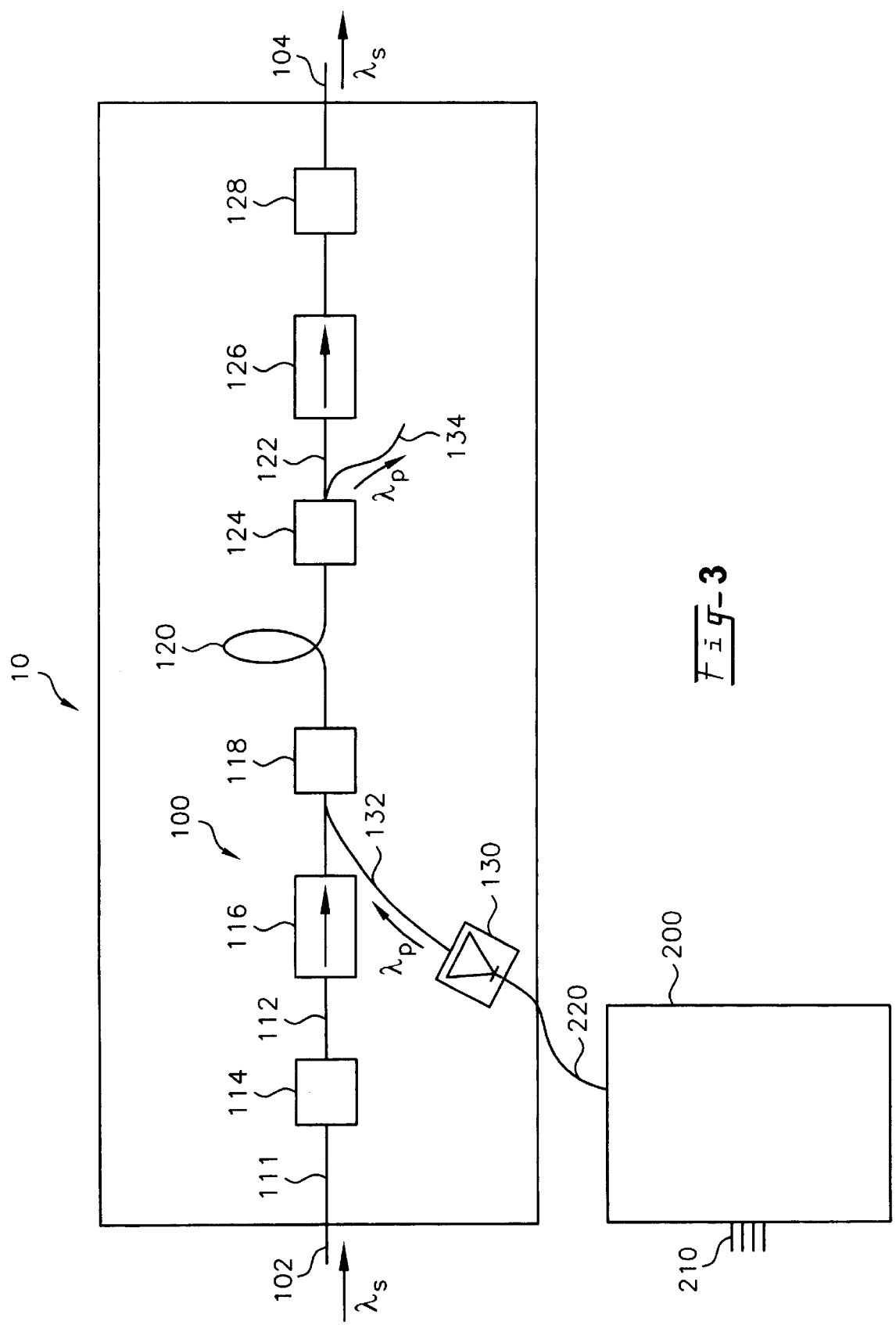
FIG. 3 is a schematic drawing of the components in the optical amplifier module.

Referring to FIGS. 1 and 2, the optical amplifier module 10 includes a plurality of optical components 100 and an electronic control board 200 disposed within a housing 300. The optical components 100 include an input 102 and an output 104. Optically disposed between the input 102 and the output 104, from left to right, as shown in FIG. 3, are additional optical components 100, including an input medium 112 optically connecting a gain equalization filter 114, a first optical isolator 116, and a first wavelength division multiplexer (WDM) 118; a gain medium 120, such as an erbium doped fiber (EDF), where the gain medium 120 has a first end optically connected to the input medium 112 and a second end; and an output medium 122 optically connected to the second end of the gain medium 120, wherein the output medium 122 optically connects a second WDM 124, a second optical isolator 126, and an amplified spontaneous emission (ASE) filter 128. The optical components 100 described above comprise a signal line 111 which extends in a first direction from the input 102 to the output 104, along which a signal light $\lambda_S$ is transmitted.

As used herein, when the optical components 100 are said to be "optically connected", light signals can be transmitted between the optical components 100. Additionally, when other optical components 100 are said to be "optically disposed" between first and second optical components, light signals can be transmitted between the first and second components serially through the other optical components 100.

Preferably, the input medium 112 and the output medium 122 are both optical fibers, although those skilled in the art will recognize that other light transmitting media, such as waveguides and free space, can be used. Preferably, connections between the input medium 112 and the equalization filter 114, the first optical isolator 116, and the first WDM 118 as well as the connections between the output medium 122 and the second WDM 124, the second optical isolator 126, and the ASE filter 128 are made by pigtailing, a technique well known in the art, which will not be described in detail herein.

Further, although the gain medium 120 is preferably an erbium doped fiber, fibers doped with other rare earth elements, or combinations of other rare earth elements or other metal elements, as disclosed in U.S. patent application Ser. No. 09/507,582 now U.S. Pat. No. 6,292,292, filed Feb. 18, 2000, Ser. No. 09/722,821, filed Nov. 28, 2000, and Ser. No. 09/722,822, filed Nov. 28, 2000, which are owned by the assignee of the present application, and which are incorporated herein in their entirety, can be used. Additionally, although the input medium 112, the gain medium 120, and the output medium 122 are preferably manufactured from a polymer, those skilled in the art will recognize that the input medium 112, the gain medium 120, and the output medium 122 can also be manufactured from a glass or other light transmitting medium. Also, although the input medium 112, the gain medium 120, and the output medium 122 are preferably fibers, those skilled in the art will recognize that the input medium 112, the gain medium 120, and the output medium 122 can also be waveguides or other doped photon transmitting devices.

A pump laser 130 is optically connected to the signal line 111 through a pump line 132. A first end of the pump line 132 is optically connected to the output of the pump laser 130 and a second end of the pump line 132 is optically connected to the first WDM 118, which optically combines a pump light $\lambda_P$ from the pump laser 130 with the signal light $\lambda_S$ from the signal line 111. Preferably, the pump laser 130 is either a 980 nanometer or a 1480 nanometer laser, having an output power of between approximately 50 mW and 300 mW, although those skilled in the art will recognize that other types of pump lasers having different wavelengths and different output power ranges can be used. Further, the pump laser 130 preferably uses a 5 volt power source, although those skilled in the art will recognize that the pump laser 130 can use a power source more or less than 5 volts.

A pump discharge line 134 can be optically connected to the signal line 111 at the second WDM 124. The second WDM 124 separates the signal light $\lambda_S$ from any residual pump light $\lambda_P$ and discharges the pump light $\lambda_P$ out the pump discharge line 134. Alternatively, those skilled in the art will recognize that the second WDM 124 and the pump discharge line 134 can be omitted, and the pump light $\lambda_P$ can be allowed to dissipate along the output medium 122. Additionally, those skilled in the art will recognize that the gain equalization filter 114 and the ASE filter 128 can be omitted, although with potential loss of amplification capability of the amplifier module 10. Further, those skilled in the art will recognize that the gain equalization filter 114 can be optically disposed in the signal line 111 between the gain medium 120 and the output 104.

The electronic control board 200 controls operation of the pump laser 130. The board 200 includes an electronic input 210, which provides connections for power and control of the pump laser 130. The board 200 also includes an electronic output 220, which is electronically connected to the pump laser 130 from an outside source (not shown). The electronic output 220 provides power and control functions to the pump laser 130. The board 200 also includes a plurality of electronically connected components 230 which control the pump laser 130, such as transistors 232, adjusting coolers 234, and a power input 236. Preferably, the electronic control board 200 is disclosed in co-pending U.S. patent application Ser. No. 09/877,946 (Attorney Docket No. PHX-0013), filed on even date, which is incorporated herein by reference in its entirety.

The board 200 includes a cutout 240 which is skewed relative to orthogonal dimensions of the housing 300. The pump laser 130 is disposed within the cutout 240. Preferably, the skewness is approximately 40–50 degrees with respect to the housing 300, although those skilled in the art will recognize that the skewness can be other angles as well. Also preferably, the cutout 240 is located proximate to a corner of the housing 300. The skewness of the cutout 240 and the proximity of the cutout 240 to the corner minimize the space required for the pump laser 130 within the housing 300 while maximizing a radius of curvature R of the pump line 132, as will be discussed in more detail later herein.

A preferred arrangement of the components of the amplifier module 10 is shown in FIGS. 1 and 2. The housing 300 is used to contain the optical components 100 and the electronic control board 200. The housing 300 has a bottom portion 310 and a top portion (not shown). Preferably, the top portion is removably secured to the bottom portion 310 with a known securing mechanism, such as at least one screw, although those skilled in the art will recognize that the top portion can be secured to the bottom portion 310 by other methods as well.

Preferably, the housing 300 is constructed from aluminum or an aluminum alloy. However, those skilled in the art will recognize that other materials, including, but not limited to, metal loaded polymers, can be used. The housing 300 has a pair of opposing longer side walls 302 having a longer interior length and a pair of opposing shorter side walls 304 having a shorter interior length, connecting each of the longer side walls 302. The side walls 302, 304, together with a bottom 305, form a cavity in which the optical components 100 and the control board 200 are disposed.

The control board 200 is disposed along the bottom 305 of the housing 300. The control board 200 is thermally connected to the bottom portion 310 of the housing 300 to enhance dissipation of heat generated by the electronically connected components 230 in the control board 200. Preferably, the transistors 232 on the control board 200 are fixedly connected to the bottom portion 310 of the housing 300 with thermally conducting material, such as metal screws 233, which further enhance heat dissipation. Additionally, the transistors 232 are preferably located against one of the longer or shorter side walls 302, 304 of the housing 300 to provide additional surface contact and further enhanced heat dissipation. Although the electronic input 210 preferably extends through a side wall 302, 304 of the housing 300, those skilled in the art will recognize that the electronic input 210 can extend through the top portion (not shown) or the bottom 305 of the housing 300.

The gain medium 120 is disposed in the housing 300 in a generally circularly spiral shape such that portions of the gain medium 120 vertically overlap other portions of the gain medium 120. Preferably, the gain medium 120 is approximately 20 meters in length, although those skilled in the art will recognize that the gain medium 120 can be more or less than 20 meters in length. Preferably, the gain medium 120 has a radius of curvature R approximately one half the shorter side 304 of the housing 300. As shown in FIGS. 1 and 2, the gain medium 120 is preferably disposed within the housing 300 such that the gain medium 120 engages or is proximate to side walls 302, 304 of the housing 300 at three locations at approximate 90 degree intervals. With such preferred configuration, the radius of curvature R of the gain medium 120 is maximized with respect to the interior of the housing 300. Since some light is lost from the gain medium 120 due to bends in the gain medium 120, maximizing the radius of curvature R of the gain medium 120 minimizes losses of the signal light $\lambda_S$ and the pump light $\lambda_P$ due to the bending of the gain medium 120.

Alternatively, the gain medium 120 can be disposed along all of the side walls 302, 304 such that the gain medium 120 is generally oval shaped, with a radius of curvature R proximate the shorter side walls 302 and generally straight portions along the longer sides 304. In this manner, a longer gain medium 120 can be utilized with the approximately the same bending losses as the generally circular design described above and shown in FIG. 1, providing potentially increased amplification ability of the amplifier 100.

The input medium 112 includes a generally straight input portion 140 that extends through a side wall 302, 304 of the housing 300 and a curved input portion 142 that generally runs along the interior wall of the shorter side wall 304 of the housing 300 and has a radius of curvature R approximately equal to the radius of curvature R of the gain medium 120. The input medium 112 straightens out along the interior wall of each of the longer side walls 302 of the housing 300, where the input medium 112 is optically connected to the gain equalization filter 114, the first optical isolator 116, and the first WDM 118. However, due to space constraints, the input medium 112 may curve along the interior wall of the shorter side wall 304 of the housing 300 between optically connected optical components 100, again preferably with a radius of curvature R approximately equal to that of the gain medium 120.

Similarly, the output medium 122 includes a generally straight output portion 144 that extends through a side wall 302, 304 of the housing 300 and a curved output portion 146 that generally runs along the interior wall of the shorter side wall 304 of the housing 300 and has a radius of curvature R approximately equal to the radius of curvature R of the gain medium 120. The output medium 122 straightens out along the interior wall of each of the longer side walls 302 of the housing 300, where the output medium 122 is optically connected to the second WDM 124, the second optical isolator 126, and the ASE filter 128. However, due to space constraints, the output medium 122 may curve along the interior wall of the shorter side wall 304 of the housing 300 between optically connected optical components 100, again preferably with a radius of curvature R approximately equal to that of the gain medium 120.

As seen in FIG. 1, the input 102 and the output 104 can both be located on the same longer side 302 of the housing 300. However, those skilled in the art will recognize that the input 102 and the output 104 can be located on different sides of the housing 300, and can also be located on the shorter side 304 of the housing 300.

A plurality of mechanical restrictors 306 are disposed in the bottom portion 310 of the housing 300 around which the input medium 112, the output medium 122, and the gain medium 120 are wound to secure the input medium 112, the output medium 122, and the gain medium 120 to the bottom portion 310 of the housing 300 and to define the radius of curvature R of the input medium 112, the output medium 122, and the gain medium 120 where the input medium 112, the output medium 122, and the gain medium 120 bend.

As shown in FIG. 1, the pump line 132 proximate to the pump laser 130 has a generally straight pump line portion 136 approximately tangent to the gain medium 120. As the pump line 132 extends optically away from the pump laser 130, the pump line 132 bends to a curved pump line portion 138 with a radius of curvature R approximately equal to the radius of curvature R of the gain medium 120. Such a configuration eliminates unnecessary bends in the pump line 132 and minimizes loss of the pump signal $\lambda_P$ prior to entering the first WDM 116 along the longer side wall 302 of the housing 300.

Preferably, the amplifier module 10 has maximum orthogonal dimensions of approximately 9.5 cm×5.3 cm×1 cm. Known pump lasers 130 are approximately 7.8 millimeters in height and drive the overall height of the module 10. Those skilled in the art will recognize that a smaller pump laser will allow the overall height of the module 10 to be decreased correspondingly.

In operation, referring to FIG. 1, signal light $\lambda_S$ is inputted to the amplifier module 10 at the input 102. The signal light $\lambda_S$ is transmitted along the signal line 111 and the input medium 112 to the gain equalization filter 114, which equalizes the strength of individual wavelengths of the signal light $\lambda_S$. Preferably, for both single-mode and multi-mode signal transmission, the signal light $\lambda_S$ has a wavelength of approximately 1310 nanometers or 1550 nanometers, although those skilled in the art will recognize that the signal light can have other wavelengths as well. The signal light $\lambda_S$ then is transmitted through the first optical isolator 116, which prevents any backscatter from being transmitted backward, toward the input 102. The signal light $\lambda_S$ is then transmitted to the first WDM 118, which combines the signal light $\lambda_S$ with the pump light $\lambda_P$.

The pump laser 130 generates the pump light $\lambda_P$ and transmits the pump light $\lambda_P$ along the pump line 132 to the first WDM 118, where the pump light $\lambda_P$ is combined with the signal light $\lambda_S$. The combined pump light $\lambda_P$ and signal light $\lambda_S$ is transmitted to the gain medium 120, where the pump light $\lambda_P$ excites ions in the gain medium 120, amplifying the signal light $\lambda_S$, as is well known in the art.

As the energy from the pump light $\lambda_P$ excites ions in the gain medium 120, the energy from the pump light $\lambda_P$ decays, and eventually dissipates. However, any residual pump light $\lambda_P$ and the signal light $\lambda_S$, now amplified, exit the gain medium 120 and are transmitted toward the output medium 122. The combined residual pump light $\lambda_P$ and signal light $\lambda_S$ are transmitted to the second WDM 124, which separates the residual pump light $\lambda_P$ and the signal light $\lambda_S$. The residual pump light $\lambda_P$ is diverted to the pump discharge line 134 for discharge from the signal line 111.

The amplified signal light $\lambda_S$ is transmitted from the second WDM 124 to the second optical isolator 126, which prevents any backscatter from being transmitted backward, toward the gain medium 120. The amplified signal light $\lambda_S$ is further transmitted along the signal line 111 to the ASE filter 128, which prevents ASE from being transmitted backward, into the gain medium 120. The amplified signal light $\lambda_S$ is then transmitted to the output 104 of the amplifier module 10.

As the signal light $\lambda_S$ transitions from the generally straight input portion 140 of the input medium 102 to the curved input portion 142, a small amount of the signal light $\lambda_S$ is lost due to the curvature of the curved input portion 142. However, since the radius of curvature R of the curved input portion is maximized as approximately one half the interior width of the housing 300, signal light $\lambda_S$ loss in minimized. Similarly, as the pump light $\lambda_P$ transitions from the generally straight pump line portion 136 to the curved pump line portion 138, a small amount of the pump light $\lambda_P$ is lost due to the curvature of the curved pump line portion 138. However, since the radius of curvature R of the curved pump line portion 138 is maximized as approximately one half the interior width of the housing 300, pump light $\lambda_P$ loss in minimized.

After the signal light $\lambda_S$ and the pump light $\lambda_P$ are combined by the first WDM 118, the combined signal light $\lambda_S$ and pump light $\lambda_P$ are transmitted through the generally circularly shaped gain medium 120. Although a small amount of both the signal light $\lambda_S$ and the pump light $\lambda_P$ are lost due to the curvature of the gain medium 120, the radius of curvature R of the gain medium 120 is maximized to minimize this loss.

After the signal light $\lambda_S$ exits the gain medium 120, the signal light $\lambda_S$ enters the output medium 122. As the signal light $\lambda_S$ is transmitted through the curved output portion 146 to the generally straight portion 144, a small amount of the signal light $\lambda_S$ is lost due to the curvature of the curved output portion 146. However, since the radius of curvature R of the curved output portion 146 is maximized as approximately one half the interior width of the housing 300, signal light $\lambda_S$ loss is minimized.

The amplifier module 10 maximizes bending radii of light transmitting media in a minimum space to minimize signal loss due to the bending of the light transmitting media. Preferably, the signal gain is at least 35 dB and maximum signal output power is greater than 18 dBm. However, those skilled in the art will recognize that the signal gain can be less than 35 dB and that the maximum signal output power can be less than 18 dBm. Operation of an embodiment of the amplifier module 10 as described herein has produced approximately 4.5 dB of noise with a −10 dBm input at 1550 nm while drawing less than 1 watt of power.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

What is claimed is:

1. An optical amplifier module comprising:
   a housing having an interior length and an interior width generally shorter than the interior length;
   an electronic control board disposed within the housing, the electronic control board including a plurality of electronically connected components;
   a gain medium disposed in the housing in a generally circularly spiral shape, the gain medium having a radius of curvature approximately one half the interior width of the housing; and
   a pump laser electronically connected to the electronic control board and optically connected to the gain medium.

2. The optical amplifier module according to claim 1, further comprising an input medium optically connected to a first end of the gain medium and an output medium optically connected to a second end of the gain medium.

3. The optical amplifier module according to claim 2, wherein the input medium comprises a curved input portion and the output medium comprises a curved output portion, each of the curved input portion and the curved output portion having a curvature approximately equal to the radius of curvature of the gain medium.

4. The optical amplifier module according to claim 3, wherein each of the input medium and the output medium extend through the housing.

5. The optical amplifier module according to claim 4, wherein one of the input and the output media extends through the housing in a direction tangent to the gain medium.

6. The optical amplifier module according to claim 1, further comprising a plurality of optical components disposed within the housing, the plurality of optical components being optically connected to the gain medium.

7. The optical amplifier module according to claim 6, wherein the plurality of optical components are disposed proximate side walls of the housing.

8. The optical amplifier module according to claim 6, wherein the plurality of optical components comprise at least one of an optical isolator and a filter.

9. The optical amplifier module according to claim 1, wherein the pump laser has an output approximately tangent to the gain medium.

10. The optical amplifier module according to claim 9, wherein the electronic control board comprises a cutout and the pump laser is disposed within the cutout.

11. The optical amplifier module according to claim 10, wherein the cutout is skewed relative to orthogonal dimensions of the housing.

12. The optical amplifier module according to claim 1, wherein the gain medium is a rare earth doped fiber.

13. The optical amplifier module according to claim 12, wherein the rare earth doped fiber is a polymer.

14. The optical amplifier module according to claim 1, further comprising a wavelength division multiplexer optically connected to the gain medium, the wavelength division multiplexer adapted to combine a signal light having a first wavelength and a pump light having a second wavelength.

15. The optical amplifier module according to claim 1, further comprising a wavelength division multiplexer optically connected to the gain medium, the wavelength division multiplexer adapted to separate light into a signal light having a first wavelength and a pump light having a second wavelength.

16. The optical amplifier module according to claim 1, wherein the electronically connected components comprise at least one of an adjusting cooler and a power input.

17. The optical amplifier module according to claim 1, wherein a maximum orthogonal dimension of the housing is approximately 10 centimeters.

18. The optical amplifier module according to claim 1, wherein a maximum orthogonal dimension of the housing are approximately 9.5 cm ×5.3 cm ×1 cm .

19. The optical amplifier module according to claim 1, wherein the electronic control board comprises a connection for exterior power and comtrol.

20. The optical amiplifer module according to claim 1, wherein the amplifier module is adapted to amplify a light signal inputted into the gain medium at least 35 Bm.

21. The optical amiplifer module according to claim 1, wherein the amplifier module is adapted to amplify a light signal inputted into the gain medium at least 18 35 1 dBm.

* * * * *

UNITED STATES PATENT AND TRADEMARK OFFICE
CERTIFICATE OF CORRECTION

PATENT NO. : 6,483,978 B1  
DATED : November 19, 2002  
INVENTOR(S) : Gao et al.

It is certified that error appears in the above-identified patent and that said Letters Patent is hereby corrected as shown below:

<u>Column 10,</u>  
Line 3, delete "Bm" and insert therefor -- dB --.  
Line 3, delete "18 35 1" and insert therefor -- 18 --.  
Line 6, delete "comtrol" and insert therefor -- control --  
Lines 7 and 11, delete "amiplifer" and insert therefor -- amplifier --;

Signed and Sealed this

Sixth Day of May, 2003

JAMES E. ROGAN  
*Director of the United States Patent and Trademark Office*